(12) United States Patent
Harris et al.

(10) Patent No.: US 12,723,149 B2
(45) Date of Patent: Sep. 1, 2026

(54) LOW PERMEATION ARTICLE WITH POLYKETONE BARRIER LAYER

(71) Applicant: ContiTech USA, Inc., Fairlawn, OH (US)

(72) Inventors: Heath Harris, Akron, OH (US); Thomas George Burrowes, North Canton, OH (US)

(73) Assignee: CONTITECH USA, LLC, Fairlawn, OH (US)

( * ) Notice: Subject to any disclaimer, the term of this patent is extended or adjusted under 35 U.S.C. 154(b) by 427 days.

(21) Appl. No.: 18/503,827

(22) Filed: Nov. 7, 2023

(65) Prior Publication Data

US 2025/0145811 A1 May 8, 2025

(51) Int. Cl.
*B32B 25/14* (2006.01)
*B32B 1/08* (2006.01)
(Continued)

(52) U.S. Cl.
CPC ............ *C08L 23/0853* (2013.01); *B32B 1/08* (2013.01); *B32B 27/08* (2013.01); *B32B 27/20* (2013.01); *B32B 27/22* (2013.01); *B32B 27/288* (2013.01); *B32B 27/306* (2013.01); *F16L 11/08* (2013.01); *B29C 48/09* (2019.02); *B29C 48/21* (2019.02); *B29K 2023/083* (2013.01); *B29K 2061/00* (2013.01); *B29K 2105/0038* (2013.01); *B29L 2023/005* (2013.01);
(Continued)

(58) Field of Classification Search
CPC ....... B32B 25/04; B32B 25/042; B32B 25/14; B32B 25/16; B32B 25/18; F16L 11/04
See application file for complete search history.

(56) References Cited

U.S. PATENT DOCUMENTS 6,412,520 B1 7/2002 Yasumatsu et al.
6,435,217 B1 * 8/2002 Bertero .................. F16L 11/08 138/137

(Continued)

FOREIGN PATENT DOCUMENTS

JP 2007032725 A 2/2007
WO 2023117418 A1 6/2023

OTHER PUBLICATIONS

EP Search Report dated Mar. 24, 2025 of counterpart European Patent Application No. 24210552.6.

*Primary Examiner* — Paul J Gray
(74) *Attorney, Agent, or Firm* — Iken S. Sans; Richard A. Wolf; Gregory Adams

(57) ABSTRACT

A multilayer permeation resistant article, such as a fuel transfer hose, includes an elastomeric layer and a polyketone (PK) barrier layer. The elastomeric layer may be directly bonded to the PK barrier layer without an intervening adhesive layer. To facilitate such direct bonding, the elastomeric layer may be formed from a composition including one or more ethylene vinyl acetate elastomer(s). The elastomeric composition may include additional elastomer(s), such as chlorinated polyethylene (CPE), acrylonitrile butadiene rubber (NBR), hydrogenated nitrile rubber (HNBR), or chlorosulfonated polyethylene (CSM). The barrier layer may exhibit a permeation rate of less than 10 g/m$^2$/day. The bonding performance of the elastomeric layer to the PK barrier layer may be characterized by an average load per width of 10 lbf/in or greater.

12 Claims, 3 Drawing Sheets

(51) Int. Cl.

| | |
|---|---|
| ***B32B 25/16*** | (2006.01) |
| ***B32B 27/08*** | (2006.01) |
| ***B32B 27/20*** | (2006.01) |
| ***B32B 27/22*** | (2006.01) |
| ***B32B 27/28*** | (2006.01) |
| ***B32B 27/30*** | (2006.01) |
| ***C08L 23/0853*** | (2025.01) |
| ***F16L 11/08*** | (2006.01) |
| *B29C 48/09* | (2019.01) |
| *B29C 48/21* | (2019.01) |
| *B29K 23/00* | (2006.01) |
| *B29K 61/00* | (2006.01) |
| *B29K 105/00* | (2006.01) |
| *B29L 23/00* | (2006.01) |
| *F16L 11/04* | (2006.01) |

(52) U.S. Cl.

CPC . *B32B 2264/1021* (2020.08); *B32B 2264/104* (2013.01); *B32B 2264/108* (2013.01); *B32B 2270/00* (2013.01); *B32B 2307/536* (2013.01); *B32B 2307/54* (2013.01); *B32B 2307/7265* (2013.01); *B32B 2307/748* (2013.01); *B32B 2597/00* (2013.01); *F16L 2011/047* (2013.01)

(56) References Cited

U.S. PATENT DOCUMENTS

| | | | | |
|---|---|---|---|---|
| 6,605,327 | B1 | 8/2003 | Ramey et al. | |
| 8,273,432 | B2 | 9/2012 | Mizutani et al. | |
| 10,036,491 | B2 | 7/2018 | Harris et al. | |
| 10,670,172 | B2 | 6/2020 | DiMascio et al. | |
| 11,643,539 | B2 * | 5/2023 | Burrowes | C08L 23/286 138/127 |
| 2011/0226375 | A1 * | 9/2011 | Harris | B32B 25/08 138/137 |
| 2014/0116562 | A1 * | 5/2014 | Haines | B32B 25/18 138/126 |
| 2016/0305581 | A1 * | 10/2016 | Fauble | B32B 1/00 |
| 2018/0264771 | A1 | 9/2018 | Speidel et al. | |
| 2019/0010317 | A1 | 1/2019 | Muco et al. | |
| 2020/0369013 | A1 * | 11/2020 | Ludlow | B32B 7/12 |
| 2022/0170575 | A1 * | 6/2022 | Heindel | B29C 48/022 |
| 2022/0275886 | A1 * | 9/2022 | Clark | B32B 27/34 |
| 2022/0373107 | A1 | 11/2022 | Traidia et al. | |

* cited by examiner 102
104
106
108
110
100

212
102
104
106
108
110
200

110
108
300
102
104

110
108'
106
400
108
102
104

LOW PERMEATION ARTICLE WITH POLYKETONE BARRIER LAYER

TECHNICAL FIELD

The present disclosure relates generally to an article having a polyketone barrier layer that provides low permeation, particularly of hydrocarbon fuel, and more particularly to a multilayer reinforced hose having such a polyketone barrier layer for low permeation applications such as a fuel transfer hose.

BACKGROUND

Thermoplastic and rubber hoses are used in a wide variety of applications for transporting fluids such as liquids and gases. For example, one common application of a multilayer hose is as a fuel pump hose (also referred to as a curb pump hose) that is used to transfer fuel from a storage tank to a vehicle at the pump. Generally, a fuel transfer hose should be strong, durable, flexible, resistant to organic solvents, resistant to volumetric expansion, offer a long service life, and have low permeability to gasoline, gasohol, diesel, biodiesel, avgas, jet fuel, or the like. Such fuel hoses also should be capable of being coupled to fittings in a manner that prevents fuel from escaping.

SUMMARY

One conventional approach for a fuel transfer hose is to provide an inner tube of elastomeric material, a permeation resistant barrier layer, a reinforcement layer, and an elastomeric cover layer. To provide low permeability to fuel, the barrier layer often is formed from a thermoplastic fluoropolymer, such as THV (tetrafluoroethylene-hexafluoropropylene-vinylidene fluoride). There is a need in the market for hoses, and permeation resistant articles in general, to replace THV materials with other materials that can provide acceptable permeation resistance to substances such as hydrocarbon fuel.

At least one aspect of the present disclosure solves one or more problems associated with conventional permeation resistant articles containing THV related barrier layers.

According to at least one aspect, the present disclosure provides a permeation resistant article having a polyketone (PK) barrier layer directly bonded to at least one elastomeric layer without an intervening adhesive layer.

Such direct bonding can obviate problems associated with adhesive layers, such as the release of volatile organic compounds which can become trapped as bubbles between layers and/or which can be applied inconsistently, each of which can result in spotty adhesion between layers.

In exemplary embodiments, the elastomeric layer includes ethylene vinyl acetate elastomer (EVM), which promotes the direct bonding to the PK barrier layer.

In exemplary embodiments, the permeation resistant article is a flexible article, such as a hose, more particularly a fuel transfer hose.

In exemplary embodiments, the bonding performance of the elastomeric layer to the PK barrier layer may be characterized by an average load per width of 10 lbf/in or greater, more particularly 25 lbf/in or greater, such as in a range from 10 lbf/in to 50 lbf/in; for example at least 10 lbf/in, 20 lbf/in, 30 lb/in, 40 lb/in or 50 lb/in; and/or an average load at average value (integral) of 10 lbf or greater, more particularly 20 lbf or greater, even more particularly 30 lbf or greater, such as in a range from about 10 lbf to 50 lbf, such values being according to ASTM D413-98.

In exemplary embodiments, the permeation resistance of the article may be characterized by a permeation rate of less than 10 $g/m^2$/day, more particularly less than 5 $g/m^2$/day, or even more particularly less than 1 $g/m^2$/day.

According to another aspect, a method of producing such a multilayer hose includes: extruding the elastomeric layer; extruding the PK barrier layer; wherein the elastomeric layer and the PK barrier layer are in direct contact without an intervening adhesive layer; activating the cure system by increasing temperature; crosslinking the elastomeric layer and directly bonding the elastomeric layer to the PK barrier layer.

According to another aspect, a hydrocarbon fuel transfer hose includes an elastomeric layer and a polyketone barrier layer.

According to another aspect, a fuel system includes a source of hydrocarbon-based fuel, and the fuel transfer hose according to any of the foregoing fluidly connected to the source of fuel and configured to transfer the fuel.

According to another aspect, a method of using such a fuel transfer hose in a fuel system includes conveying liquid hydrocarbon fuel through the fuel hose.

The following description and the annexed drawings set forth certain illustrative embodiments according to the present disclosure. These embodiments are indicative, however, of but a few of the various ways in which the principles of the invention may be employed. Other objects, advantages and novel features according to aspects of the present disclosure will become apparent from the following detailed description when considered in conjunction with the drawings.

BRIEF DESCRIPTION OF THE DRAWINGS

The annexed drawings, which are not necessarily to scale, show various aspects according to the present disclosure.

DETAILED DESCRIPTION

Figures 1, 2:
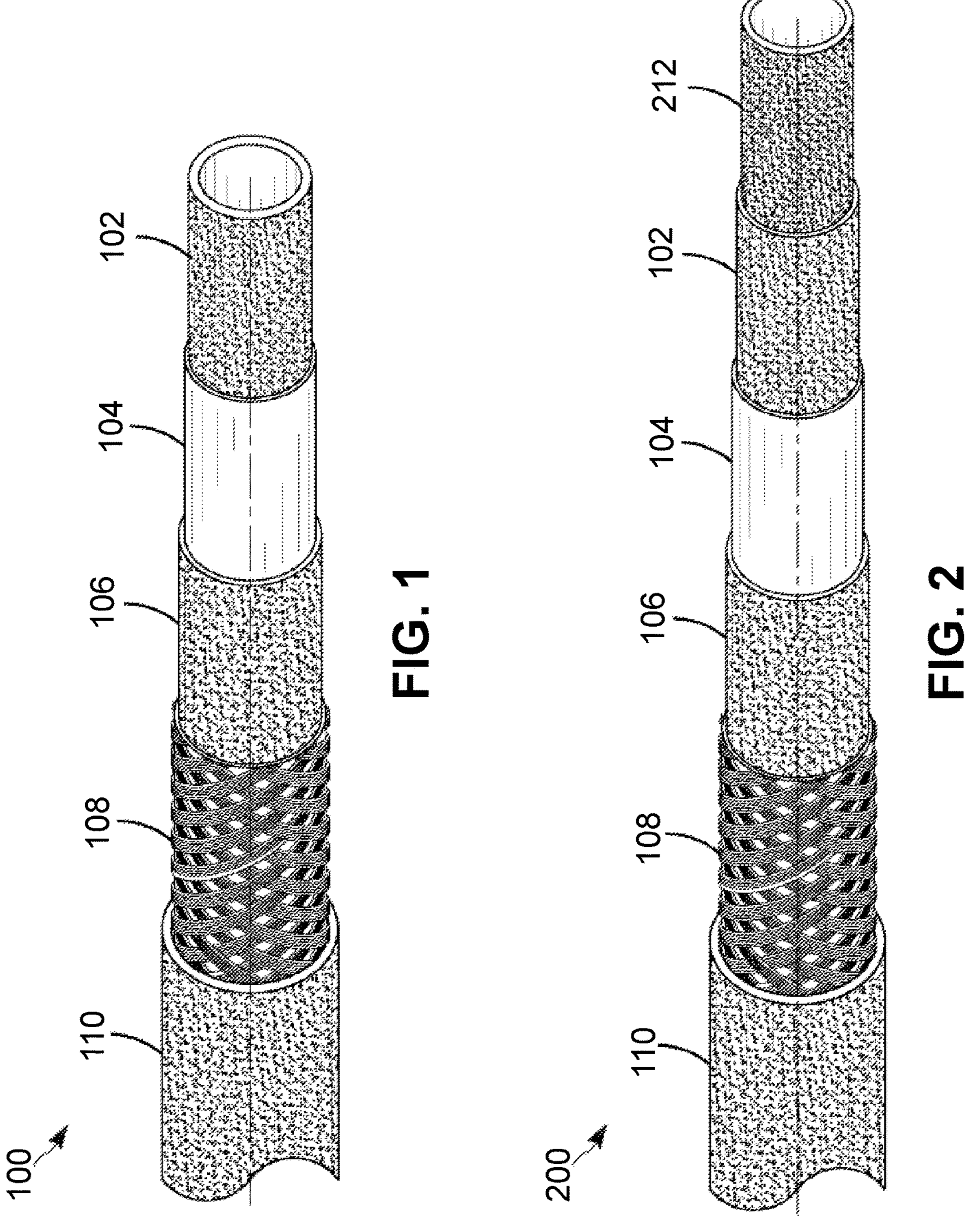
FIG. 1 shows an exemplary embodiment of a hose according to the present disclosure.
FIG. 2 shows another exemplary embodiment of a hose according to the present disclosure.

The principles and aspects of the present disclosure have particular application to hoses, in particular fuel transfer hoses, and thus will be described herein chiefly in this context. It is understood, however, that the principles and aspects of the present disclosure may be applicable to other types of hoses for other applications, or to other articles in general, when desirable to provide one or more advantages of the material(s) and/or construction(s) described herein.

Many conventional permeation resistant articles such as fuel transfer hoses use material such as THV (tetrafluoroethylene-hexafluoropropylene-vinylidene fluoride) as a barrier layer, which these materials may fall under strict regulation. Thus, there is a market need to reduce or eliminate THV materials from articles in industry.

Aspect(s) according to the present disclosure replace THV barrier materials with a polyketone (PK) barrier layer that is directly bonded to at least one elastomeric layer without an intervening adhesive layer to thereby provide a flexible and permeation resistant article. Aspect(s) according to the present disclosure also provide a unique approach to using polyketone as a barrier layer in a fuel transfer hose.

Polyketone Barrier Layer

The PK barrier layer may be formed from an aliphatic polyketone material of formula $[\text{—CHR}_1\text{CH}_2(\text{C═O})\text{—}]_n[\text{—CHR}_2\text{CH}_2(\text{C═O})\text{—}]_m]_P$. In the formula, $R_1$ and $R_2$ are different from each other and are independently hydrogen or a $C_1$-$C_{12}$-alkyl group, n+m=1, and p is an integer. The two comonomers may be randomly distributed or present as blocks.

In the specified aliphatic polyketone formula, if $R_1$ and/or $R_2$ is a $C_1$-$C_{12}$-alkyl group, the $C_1$-$C_{12}$-alkyl group may be selected from methyl, ethyl, propyl, pentyl or heptyl. In exemplary embodiments, $R_1$ may be a $C_1$-$C_{12}$-alkyl group such as a methyl group and $R_2$ is H. In certain embodiments, when $R_1$ is a $C_1$-$C_{12}$-alkyl group, "n" is preferably less than 0.5, in particular less than 0.1, and more particularly between 0.02 and 0.08. In another embodiment, n=0 and $R_2$ is H, in which the aliphatic polyketone is present as poly (ethylene ketone). "P" may be an integer between 500 and 5000, for example.

The aliphatic polyketone may have a weight-average molecular weight Mw of at least 40,000 g/mol, and in particular at least 60,000 g/mol. In certain embodiments, the aliphatic polyketone has a molecular weight of at least 200,000 g/mol. For example, the aliphatic polyketone may have a weight-average molecular weight Mw of 140,000 g/mol to 410,000 g/mol, more particularly a weight-average molecular weight of 150,000 g/mol to 210,000 g/mol or of 290,000 g/mol to 400,000 g/mol and even more particularly a weight-average molecular weight of from 160,000 g/mol to 200,000 g/mol or from 300,000 g/mol to 390,000 g/mol. The weight average molecular weight Mw can be determined by GPC using suitable standards.

The aliphatic polyketone may be semi-crystalline, which such crystallinity can be detected using DSC measurements of the polymer. The aliphatic polyketone polymer may contain at least 80% by volume, in particular at least 90% by volume, and particularly at least 95% by volume, of the structural units (I) and (II). Variations of the polyketone material may have different lengths, may have a linear chain or branched polymer chains and/or may have the presence of polar functional groups. The PK barrier layer may be formed from a single type of aliphatic polyketone material or may be formed from a mixture of different types of PK materials.

In certain embodiments, the aliphatic polyketone has a melting temperature between about 190° C. and about 250° C., more particularly between about 200° C. to about 220° C. The polyketone barrier layer can be processed by conventional techniques, for example, by extrusion.

In exemplary embodiments, the polyketone barrier layer may have a permeability of CE10 fuel characterized by a permeation rate of less than 15 g/m$^2$/day, more particularly less than 10 g/m$^2$/day, more particularly less than 5 g/m$^2$/day, or even more particularly less than 1 g/m$^2$/day. Such values may be based on SAE J2665 testing standard or corresponding testing at atmospheric conditions (e.g., about 25° C. and about 30 in·Hg).

Table 1 illustrates permeation results of polyketone barrier layer samples (PK-1 through PK-4) compared against THV barrier layer samples (THV-1 through THV-4) of a type currently used in conventional fuel hoses. The polyketone tested was extrusion grade POKETONE M710F from Hyosung. In the test, barrier layer material of about 0.5 mm for the polyketone and 0.25 mm for the THV is cut into a shape that fits over the mouth of a glass jar but fits inside a tightening ring used to seal the glass jar. 100 mL of CE10 fuel is placed into the glass jar. A FKM rubber gasket is placed on the jar rim, then the barrier material is placed on top the gasket, covering the opening to the jar. The tightening ring is used to push the whole assembly together to seal the jar. The assembly is weighed immediately after sealing and then subsequently in the days following to measure the weight loss after each interval which can be used to calculate permeation rate (fuel vapor loss). All testing is conducted at atmospheric conditions (e.g., room temperature (~25° C.)).

TABLE 1

| | Permeation Rate (g/m$^2$/day) | | |
|---|---|---|---|
| | 3 Day | 14 Day | 28 Day |
| PK-1 | 7.3 | 2.2 | 1.5 |
| PK-2 | 0.6 | 0.7 | 0.8 |
| PK-3 | 0.6 | 0.7 | 0.8 |
| PK-4 | 0.0 | 0.6 | 0.7 |
| THV-1 | 4.7 | 1.2 | 0.6 |
| THV-2 | 0.3 | 0.1 | 0.0 |
| THV-3 | 5.5 | 1.2 | 0.6 |
| THV-4 | 0.3 | 0.1 | 0.0 |

As shown in these test results, the PK barrier layer material exhibits permeation loss rates that are comparable to the conventional THV material, suggesting that the PK barrier layer is suitable for use as a barrier layer in a permeation resistant article such a fuel transfer hose. Although a variation of the standard SAE J2665 permeation rate test, these results are believed to be consistent with the SAE J2665 standard.

In the context of its use in an article, such as a hose, it is understood that the aliphatic polyketone in the barrier layer may additionally contain one or more compounding additives to improve its processability and/or material properties. Such additives may be selected from one or more of reinforcing agents, antioxidants, heat stabilizers, ultraviolet absorbers, light stabilizers, lubricants, inorganic fillers, antistatic agents, flame retardants, accelerators, plasticizers, dyes, impact modifiers or the like. Alternatively, the barrier layer may consist essentially of pure (e.g., 95%+ or 99%+) aliphatic polyketone material(s) as described above, with no, or substantially no, compounding additives added to the PK composition.

Elastomeric Layer

The elastomeric layer of the article generally provides flexibility and elasticity, and also can facilitate sealing of the article to restrict loss of the substance to be contained. Depending on the location in the article, the elastomeric layer also can provide chemical resistance, permeation resistance, sealability, or various other functions.

The elastomeric layer may be formed from an elastomeric composition that includes one or more polymers and one or more additives, each of which may be of any suitable type and provided in any suitable amount to form the desired article. The one or more polymers of the elastomeric composition form the matrix and serve as the base of the composition. As such, the total polymer content forming the base composition (including mixtures of base polymers) is set at 100 phr. The additives are compounded relative to the total base polymer content of the composition, and as such may be represented in parts per hundred (phr), which means parts per 100 parts of the base polymer(s).

In exemplary embodiments, the elastomeric composition is specially formulated to provide direct bonding to the PK barrier layer without an intervening adhesive layer being utilized. Such direct bonding can obviate problems associated with adhesive layers, such as bubbles between layers and/or spotty adhesion between layers. This also can be achieved without using polyketone in the formulation of the elastomeric layer.

More particularly, in certain embodiments, the elastomeric layer is formed from an elastomeric composition formulated to include one or more base polymer(s), one or more reinforcing filler(s), one or more plasticizer(s), one or more activator(s), one or more curative(s), and one or more cross-linking co-agent(s). Each of these ingredients of the exemplary elastomeric composition will be described in further detail below for sake of clarity and not limitation.

Elastomer Base Polymer(s)

As noted above, the one or more base polymer(s) of the elastomeric composition form the elastic matrix within which the various additives are dispersed to impart the desired properties. The total amount of the base polymer(s) present in the composition is about 100 phr, which can be divided among a mixture of one or more different types of polymer, such as different types of elastomers/rubbers.

According to an aspect of the present disclosure, the present inventors surprisingly found that using ethylene-vinyl acetate polymer in the elastomeric composition provided an unexpectedly improved bonding performance to the PK barrier layer material without the need for an intervening adhesive between the layers.

The ethylene-vinyl acetate polymer is produced by copolymerization of ethylene and vinyl acetate. The general properties of the copolymer is determined mainly by the ratio of the two components. Polyethylene is a thermoplastic with a low glass transition temperature and high crystallinity. Polyvinylacetate is also a thermoplastic, but with a higher glass transition temperature and an amorphous structure. When vinyl acetate is copolymerized with a polyethylene chain, the resultant copolymer is usually thermoplastic; however, when the vinyl acetate content in the copolymer is increased, there are is a greater regularity of interruptions in the ethylene chain, and the more crystallization is reduced. As such, depending on the ratio of vinyl acetate to ethylene, the result of copolymerization can be an elastomeric copolymer having methylene units forming a saturated polymer backbone with pendant acetate groups. This elastomeric copolymer commonly is designated ethylene-vinyl acetate copolymer (EVM), which is a rubber-like material.

Generally, below about 40 wt. % vinyl acetate and above about 90 wt. % vinyl acetate, the thermoplastic properties of the EVM material can become predominant over the elastomeric properties. In addition, above about 60 wt. % vinyl acetate, the crystallinity of the material may become entirely absent such that the material is amorphous. As such, to impart elastic properties to the elastomeric layer, the EVM polymer(s) utilized in the elastomeric composition may have a vinyl acetate content in a range from about 40% by weight of the copolymer to about 90% by weight of the copolymer. In exemplary embodiments, the EVM polymer has a vinyl acetate content from about 50% by weight of the copolymer to about 90% by weight of the copolymer. Generally, the vinyl acetate content may be in a range of about 40, 45, 50, 55, 60, 65, 70, 75, 80, 85, or 90% by weight of the copolymer.

The EVM polymer may be present in the elastomeric composition in any suitable amount, and may be combined with any other suitable polymer(s) in the elastomeric composition to provide the desired overall properties for the article. For example, the total amount of EVM polymer present in the elastomeric composition may be in a range from about 5 phr to about 80 phr, more particularly from about 10 phr to about 50 phr, or even more particularly from about 10 phr to about 30 phr, such as about 10, 15, 20, 30, 40, 45, 50, 55, 60, 70, or 80 phr (including all values and ranges between the stated values). If too little EVM polymer is in the elastomeric composition, such as less than the above-identified range(s), then the bonding performance of the elastomeric layer to the PK barrier layer may be insufficient. On the other hand, if too much EVM polymer is in the elastomeric composition, such as greater than the above-identified range(s), then the elastomeric composition may be too flexible, may be too weak, have too low of a viscosity to process in an article such as a hose, or the like.

In exemplary embodiments, the elastomeric composition includes at least one elastomeric polymer in addition to the EVM polymer. The choice and amount of the additional elastomeric polymer may depend on the desired performance of the elastomeric layer in the article. For example, in an article where the elastomeric layer comes into contact with hydrocarbon fuel, such as an inner tube of a fuel transfer hose, the additional elastomeric polymer(s) may include such polymers that provide chemical resistance to the hydrocarbon fuel. As an example, such polymers may include, but are not limited to, chlorinated polyethylene (CPE), acrylonitrile butadiene rubber (NBR), hydrogenated nitrile rubber (HNBR), chlorosulfonated polyethylene (CSM), chloroprene rubber (CR), styrene butadiene rubber (SBR), or the like.

The additional polymer(s) (e.g., CPE, etc.) may be present in any suitable amount, such as in a total amount from about 20 phr to about 95 phr, more particularly from about 50 phr to about 90 phr, or even more particularly from about 70 phr to about 90 phr, such as about 20, 30, 40, 50, 60, 70, 80, 90, or 95 phr (including all values and ranges between the stated values). If too much additional polymer(s) is/are present in the elastomeric composition relative to the EVM, such as greater than the above-identified range(s), then the composition may not have enough EVM content to secure a direct bond to the PK barrier layer. If too little additional polymer(s) is/are present relative to the EVM, such as less than the above-identified range(s), then the elastomeric layer may not have suitable properties such as strength, chemical resistance, or the like.

To balance the characteristics of the EVM polymer(s) relative to the additional polymer(s) (e.g., CPE, etc.), these ingredients may be provided in a ratio relative to each other in the elastomeric composition. For example, a ratio of the total amount of EVM polymer(s) to the total amount of additional base polymer(s) (EVM:P) may be in a range from about 5:95 to about 80:20, more particularly about 10:90 to about 50:50, such as 5:95, 10:90, 20:80, 30:70, 40:60, 50:50, etc. In certain embodiments, the EVM polymer(s) may be present in a total amount that is less than the total amount of the additional base polymer(s).

To promote bonding of the elastomeric layer to the PK barrier layer, the elastomeric composition includes a suitable amount of the EVM polymer(s) available at the elastomeric layer surface to bond to the polyketone material. Such exposure of the molecules of the EVM polymer(s) at the surface may be characterized in terms of volume percent. As such, in exemplary embodiments, the EVM polymer(s) may have a total volume percent relative to the overall elastomeric composition in a range from about 3 vol. % to about 48 vol. %, more particularly from about 5 vol. % to about 30 vol. %, such as about 3, 5, 10, 15, 20, 25, 30, 35, 40, 45 or 48 vol. %.

In addition to providing bonding performance, the EVM material may provide other advantageous. For example, EVM has the ability to be extruded, which can be beneficial for manufacturing articles such as hose. In addition, because the polymer backbone of EVM is fully saturated, it also exhibits acceptable chemical resistance to substances such as gas or oil. As such, the inclusion of the EVM polymer(s) can improve the properties of the additional polymer(s) (e.g., CPE) with respect to such features. In some embodiments, it may be beneficial to provide the EVM polymer as the entire base polymer content (e.g., 100 phr) of the elastomeric composition. On the other hand, the unique polarity of the overall composition having EVM combined with CPE, NBR, HNBR, CSM, etc. may provide an unexpectedly improved bonding effect with the PK material.

Elastomer Reinforcing Agent(s)/Filler(s)

The one or more reinforcing agents or reinforcing fillers in the elastomeric composition may enhance specific characteristics, such as the mechanical properties of the elastomeric composition. The reinforcing filler(s) in the elastomeric composition may be of any suitable type or combination of types and may be in any suitable amount(s) as may be desired for the application.

In certain embodiments, the elastomeric composition contains one or more different types of reinforcing agent(s) in a total amount from about 40 phr to about 120 phr, more particularly 50 phr to about 100 phr, more particularly from about 60 phr to about 80 phr, such as about 40, 50, 60, 70, 80, 90, 100, or 120 phr. If too much total reinforcing agent, such as greater than the above-identified range(s) is present, the elastomeric composition may become excessively stiff and less elastic, leading to a reduction in flexibility and elongation at break. If too little total reinforcing agent is added, such as below the above-identified range(s), the reinforcing effect may not be sufficient, leading to weaker mechanical properties in the rubber.

In exemplary embodiments, the elastomeric composition contains one or more calcium carbonate(s) as at least one of the reinforcing agents. The calcium carbonate(s) may have a mean particle size of about 10 to 30 microns, with finer particles providing more reinforcement. The calcium carbonate(s) may be present in the composition in a total amount from about 25 phr to about 75 phr, more particularly from about 40 phr to about 60 phr, such as about 25, 35, 45, 50, 60 or 75 phr.

Alternatively or additionally, the elastomeric composition may contain one or more silica(s) as a reinforcing agent. The silica(s) may have a mean particle size of about 10 to 30 microns. The silica(s) may be present in the composition in a total amount from about 10 phr to about 50 phr, more particularly from about 10 phr to about 30 phr, such as about 10, 20, 30, 40 or 50 phr.

Alternatively or additionally, the elastomeric composition may contain one or more carbon black(s) as a reinforcing agent also the elastomeric composition. Typically, carbon blacks use a naming convention as specified by ASTM D1765 to identify the particular type and size of the carbon black. For N-series carbon blacks, grades range from N110 to N990, in which the first numerical digit designates a size or surface area of the carbon black, and the last two numerical digits designate the structural complexity of the carbon black. A lower first digit (e.g., N100-series) has a smaller particle size, and thus higher surface area, than a higher first digit (e.g., N900-series). Unlike virgin carbon black, recovered carbon black (rCB) does not use the same N-number designation system according to ASTM D1765; however, the rCB still may have at least an equivalent mean particle size as N-series designated virgin carbon black, and thus any designation of an N-type carbon black as used herein encompasses both virgin and other types of equivalent carbon black (e.g., rCB) unless specifically stated otherwise.

In exemplary embodiments, the elastomeric composition contains carbon black(s) in a range between N500-series and N700-series. In certain embodiments, the composition includes only one type of medium-sized carbon black, such as N700-series (e.g., 70 to 90 nm size). The carbon black(s) may be present in the elastomeric composition in a total amount from about 10 phr to about 50 phr, more particularly from about 10 phr to about 30 phr, such as about 10, 20, 30, 40 or 50 phr.

In exemplary embodiments, the elastomeric composition includes at least one mineral filler (e.g., silica and/or calcium carbonate), such as in the above-identified amounts, which may promote bonding to the PK barrier layer. In certain embodiments, the elastomeric composition contains less than 15 phr any carbon black, more particularly is free of any carbon black, while still maintaining a total reinforcing agent content within the above-identified range(s).

Elastomer Plasticizer(s)

The one or more plasticizers in the elastomeric composition may increase flexibility, reduce hardness, and improve the processing characteristics of the compound. The plasticizer(s) in the elastomeric composition may be of any suitable type or combination of types and may be in any suitable amount(s) as may be desired for the application. For example, suitable plasticizer(s) may include trimellitate esters, paraffinic oil, naphthenic oil, or the like.

In exemplary embodiments, the chosen plasticizer(s) is of a low-extractable or non-oil type, which may be particularly suitable for applications of the article which are exposed to chemicals such as hydrocarbon fuel. The chosen plasticizer also should be compatible with the base polymer(s) of the elastomeric composition. An example of a low-extractable or non-oil plasticizer is trioctyl trimellitate (TOTM), for example.

The one or more plasticizers (e.g., TOTM) may be present in the elastomeric composition in a total amount from about 10 phr to about 40 phr, more particularly about 15 phr to about 30 phr, such as about 10, 25, 30, or 40 phr. In specific embodiments, only one type of plasticizer (e.g., TOTM) is used in the elastomeric composition in the stated ranges or amounts. If too much total plasticizer is used in the elastomeric composition, such as greater than the above-identified range(s), then the compound may exhibit excessive softening making it difficult to process, may cause dimensional instability, and may have reduced strength. If too little plasticizer is used in the compound, such as less than the above-identified range(s), then the elastomeric composition may be hard, brittle, and/or have reduced flexibility.

Elastomer Activator(s)/Scavenger(s)

The one or more activators help activate the curing system and promotes the formation of crosslinks between polymer chains during vulcanization. Any suitable activator(s) or combination of activator(s) in any suitable quantity may be utilized in the elastomeric composition.

For example, suitable activators may include stearic acid, carbamate, thiazole, or the like. In exemplary embodiments, the activators are of a type that provide low-extraction or low ability to contaminate the product in contact with the elastomeric composition.

The activator(s) may be present in the elastomeric composition in a total amount from about 1 phr to about 15 phr, more particularly from about 5 phr to about 10 phr.

The elastomeric composition also may include one or more acid scavenger(s). Any suitable acid scavenger(s) or combination of scavenger(s) in any suitable quantity may be utilized in the elastomeric composition. In exemplary embodiments, the acid scavenger(s) scavenge HCl that may be present in the elastomeric composition during processing, such as when using a chlorinated polymer (e.g., CPE) as the additional elastomer. As an example, the elastomeric composition may include magnesium oxide, which may be present in an amount from about 1 phr to about 12 phr, more particularly about 5 phr to about 10 phr.

Elastomer Vulcanizing Agent(s)/Co-Agent(s)

The vulcanizing agent(s) or curatives are chemicals that cross-link the polymer chains in the base rubber(s), making it more elastic and less prone to deformation.

In exemplary embodiments, the vulcanizing agent includes a suitable peroxide, such as an organic peroxide. This includes, but is not limited to dicumyl peroxide, bis-(t-butyl peroxy-diisopropyl benzene, t-butyl perbenzoate, di-t-butyl peroxide, di-(tert-butylperoxyisopropyl)benzene, 2,5-dimethyl-2,5-di-t-butylperoxyhexane, alpha.-.alpha.-bis(t-butylperoxy)diisopropylbenzene.

In certain embodiments, a cure-effective amount of the vulcanizing agent(s) (e.g., organic peroxide) may be in a range from about 2 phr to about 10 phr, more particularly from about 4 phr to about 6 phr. In certain embodiments, the composition is devoid of sulfur, which could be a contaminant to the substance in contact with the elastomeric layer (e.g., hydrocarbon fuel).

The elastomeric composition also may include crosslinking co-agent(s) that operate together with the peroxide cure system to promote cross-linking the base polymer(s). The cross-linking co-agent(s) may be particularly suitable for EVM polymer, and more particularly EVM combined with another polymer such as CPE. The cross-linking co-agent(s) also may help to promote the chemical bonding effect between the elastomeric composition and the polyketone material of the barrier layer. The cross-linking co-agent(s) may be of any suitable type, such as a triallyl cyanurate (TAC) or diallyl cyanurate, for example. The elastomeric composition may contain such co-agent(s) in a total amount from about 2 phr to about 15 phr, more particularly from about 4 phr to about 10 phr, for example.

Material Properties

The elastomeric composition may have properties that make it particularly suitable for permeation resistant applications, such as for hoses, or the like. Accordingly, in exemplary embodiments, the material properties of the elastomeric composition may include one or more original properties of: (i) elongation at break of greater than about 70%, more particularly greater than 100%, such as in a range from about 70% to about 350%; (ii) modulus at 100% of greater than 500 psi, such as from about 500 psi to about 1,500 psi; (iii) tensile strength of greater than 1,000 psi, more particularly greater than about 1,250 psi, such as from about 1,000 psi to about 4,000 psi; (iv) Shore A hardness in a range from about 70 to 90.

The elastomeric composition also may have cure time at temperature that permits flowability of the elastomeric composition to promote contact and bonding to the PK barrier layer. For example, at a temperature of about greater than 150 OF the material may begin to flow, and the cure time to reach a cure temperature (e.g., about 305° F.) may be greater than 30 minutes, such as in a range from 30 minutes to 90 minutes to promote bonding to the PK barrier layer.

In exemplary embodiments, the bonding performance of the elastomeric layer to the PK barrier layer may be characterized by an average load per width of 10 lbf/in or greater, more particularly 25 lbf/in or greater, such as in a range from 10 lbf/in to 50 lbf/in; and/or an average load at average value (integral) of 10 lbf or greater, more particularly 20 lbf or greater, even more particularly 30 lbf or greater, such as in a range from about 10 lbf to 50 lbf, such values being according to ASTM D413-98. Ideally, the failure mode of the peel/bond test is predominantly through the elastomeric composition instead of at the interface between the elastomeric layer and the PK layer.

The tensile, elongation, and modulus evaluations may be determined by ASTM-D412 at ~25° C. The Shore A hardness evaluation may be determined by ASTM-D2240 at ~25° C. The bonding evaluations may be determined by a peel test method according to ASTM D413-98 at ~25° C.

EXAMPLES

Example elastomeric compositions were prepared and tested for the purpose of further illustrating the nature of some of the embodiments and aspects of the disclosure and are not intended as a limitation on the scope thereof. These examples are shown in Tables 2 and 3.

Referring to Table 2, various elastomeric formulations for different test samples are shown. This includes a comparative example ("Comp. Ex.") that does is based on CPE polymer and does not utilize an EVM polymer, and examples (Ex. 1 through Ex. 6) that utilize EVM polymer in combination with CPE polymer.

TABLE 2

| Ingredient | Unit | Ex. 1 | Ex. 2 | Ex. 3 | Ex. 4 | Ex. 5 | Ex. 6 | Comp. Ex. |
|---|---|---|---|---|---|---|---|---|
| CPE Rubber | phr | 50 | 50 | 75 | 75 | 90 | 90 | 100 |
| EVM (60% vinyl acetate) | phr | 50 | 0 | 25 | 0 | 10 | 0 | 0 |
| EVM (90% vinyl acetate) | phr | 0 | 50 | 0 | 25 | 0 | 10 | 0 |
| Calcium Carbonate | phr | 50 | 50 | 50 | 50 | 50 | 50 | 25 |
| Carbon Black (N762) | phr | 0 | 0 | 0 | 0 | 0 | 0 | 20 |
| Silica | phr | 20 | 20 | 20 | 20 | 20 | 20 | 20 |
| TOTM Plasticizer | phr | 25 | 25 | 25 | 25 | 25 | 25 | 25 |

TABLE 2-continued

| Ingredient | Unit | Ex. 1 | Ex. 2 | Ex. 3 | Ex. 4 | Ex. 5 | Ex. 6 | Comp. Ex. |
|---|---|---|---|---|---|---|---|---|
| MgO Scavenger | phr | 8.5 | 8.5 | 8.5 | 8.5 | 8.5 | 8.5 | 8.5 |
| Organic Peroxide Curative | phr | 5.8 | 5.8 | 5.8 | 5.8 | 5.8 | 5.8 | 5.8 |
| TAC Curing Co-agent | phr | 7.6 | 7.6 | 7.6 | 7.6 | 7.6 | 7.6 | 7.6 |
| Running Total | phr | 216.9 | 216.9 | 216.9 | 216.9 | 216.9 | 216.9 | 211.9 |

Table 3 shows the results of bond testing according to a peel test method determined according to ASTM D413-98 in which the elastomeric composition of Examples 1 and 2 and Comparative Example 1 were bonded to a polyketone layer, namely a polyketone sold by Hyosung under the trade name POKETONE M710F. The composite test sample including the elastomeric composition bonded to the PK barrier material was cured under pressure of 80 psi. The tensile, elongation, and modulus testing was determined according to ASTM D412. Shore A hardness testing was determined according to ASTM D2240.

TABLE 3

| Test | Unit | Ex. 1 | Ex. 2 | Ex. 3 | Ex. 4 | Ex. 5 | Ex. 6 | Comp. Ex. |
|---|---|---|---|---|---|---|---|---|
| PEEL TEST | | | | | | | | |
| Average load/width | N/mm | 5.1 | 6.65 | 7.94 | 6.27 | 7.77 | 6.96 | 1.01 |
| Average load at average value (integral) | lbf | 29.11 | 37.97 | 45.32 | 35.78 | 44.39 | 39.73 | 5.77 |
| ORIGINAL PHYSICAL TEST | | | | | | | | |
| Tensile | psi | 1542 | 1721 | 1892 | 1846 | 1621 | 2259 | 2633 |
| Elongation | % | 246 | 316 | 289 | 308 | 274 | 349 | 248 |
| Modulus at 100% | psi | 555 | 637 | 512 | 573 | 507 | 493 | 797 |
| Shore A Hardness | | 72 | 84 | 74 | 83 | 76 | 77 | 76 |

The results of this testing surprisingly show that the introduction of EVM polymer maintains material properties in terms of tensile, elongation, modulus and Shore A hardness as compared to the comparative example free of EVM. In addition, the results of the tests unexpectedly showed that the introduction of EVM polymer with the CPE significantly improved bonding performance with the polyketone material by more than 5 times the result of CPE without EVM. In these tests, the failure mode was predominantly through the elastomeric material instead of at the interface.

Of particular surprise was how little the total amount of EVM polymer(s) were required to significantly improve bond strength, as samples with as little as 10 phr of total EVM content show improved bond strength. This provides numerous advantages in terms of processability, cost or the like, as EVM polymer can reduce viscosity of the blend and thus too much EVM polymer can cause the mixture to be weak or difficult to process, especially for articles such as hose. Although tested at 10 phr total EVM polymer(s), it is expected that values as low as 5 phr total EVM polymer(s) also could provide suitable bonding performance. On the other hand, in some applications, it is possible that a total EVM polymer content could be up to 80 phr and still be processable and provide certain beneficial attributes for certain articles.

According to the understandings of such results, an exemplary elastomeric composition having properties suitable for use in a permeation resistant article, in particular a hose, in which the elastomeric composition is directly bonded to a polyketone barrier layer without an intervening adhesive, includes: ethylene vinyl acetate elastomer(s) (EVM(s)) in a total amount from about 5 phr to about 80 phr, more particularly from about 10 phr to about 50 phr, or even more particularly from about 10 phr to about 30 phr; additional elastomer(s), more particularly CPE(s), NBR(s), HNBR(s), CSM(s), CR(s), SBR(s), in a total amount from about 20 phr to about 95 phr, more particularly from about 50 phr to about 90 phr, or even more particularly from about 70 phr to about 90 phr; reinforcing agent(s), more particularly calcium carbonate(s), silica(s), and/or carbon black(s), in a total amount from about 40 phr to about 120 phr, more particularly from about 50 phr to about 100 phr; non-oil plasticizer(s), more particularly trimellitate ester plasticizer(s), in a total amount from about 10 phr to about 40 phr, more particularly about 15 phr to about 30 phr; optionally acid scavenger(s), such as magnesium oxide, in a total amount from about 1 phr to about 15 phr, more particularly from about 5 phr to about 10 phr. The elastomeric composition may be cured with organic peroxide in a total amount from about 2 phr to about 10 phr, and a curing co-agent, such as TAC, in a total amount from about 2 phr to about 15 phr. The EVM(s) may have a vinyl acetate content in a range from about 40% by weight of the copolymer to about 90% by weight of the copolymer, more particularly from about 50 wt. % to about 90 wt. %.

In addition, it is noted that in Examples 1-6 the total volume percent of EVM polymer(s) relative to the overall elastomeric composition was in a range from about 5 vol. % to about 30 vol. %, which is believed to provide a suitable amount of the EVM polymer molecules available at the elastomeric layer surface to bond to the polyketone material with acceptable bond strength. In particular, the total volume percent of EVM for each example was 5.5 vol. % EVM for Example 6, 6.1 vol. % EVM for Example 5, 28.1 vol. % EVM for Example 2, and 30.1 vol. % EVM for Example 1. In embodiments where the total EVM polymer(s) content is increased to 80 phr, the total volume percent of EVM polymer(s) relative to the overall elastomeric composition may be up to about 48 vol. %. Again, however, it was surprising how little total volume percent of EVM polymer(s) provided a suitable bond in the experiments, and thus in certain embodiments it may be beneficial to have the total volume percent of EVM polymer(s) in a lower range. For example, at a total EVM polymer(s) content of 5 phr, the EVM volume percent may be as low as about 3 vol. %.

Elastomeric Layer Alternatives

Although exemplary polymer(s) of the elastomeric composition have been described above, it is understood that the elastomeric composition could include different polymers(s) or additional polymers(s), each of which may be of any suitable type and in any suitable amount to form the desired article. For example, the one or more polymers in the elastomeric composition could include, for example, natural rubber (NR), epoxidized natural rubber (ENR), polybutadiene rubber (BR), acrylonitrile butadiene rubber (NBR), carboxylated nitrile rubber (XNBR), (partially) hydrogenated nitrile rubber (HNBR), styrene butadiene rubber (SBR), carboxylated styrene-butadiene rubber (XSBR), styrene/ethylene-butylene/styrene-based (SEBS), ethylene propylene monomer (EPM), ethylene propylene diene monomer (EPDM), chloroprene rubber (CR), isoprene rubber (IR), butyl rubber (IIR), bromobutyl rubber (BIIR), chlorobutyl rubber (CIIR), chlorinated polyethylene (CPE), chlorosulfonated polyethylene (CSM), alkylated chlorosulfonated polyethylene (ACSM), polyepichlorohydrin rubbers (CO; ECO; ETER), ethylene-vinyl acetate (EVM), acrylate rubber (ACM), ethylene-acrylate rubber (AEM), silicone rubber (MQ, VMQ, PVMQ, FVMQ), fluorine rubber (FKM), fluorinated methylsilicone rubber (MFQ), perfluorinated propylene rubber (FFPM), perfluorocarbon rubber (FFKM), thermoplastic elastomers (TPE), thermoplastic vulcanizates (TPV), thermoplastic polyurethanes (TPU), polyolefin elastomers (POE), polyvinylchloride (PVC), and/or polyurethane (PU), and/or the like, or blends thereof.

Moreover, although exemplary additive(s) of the elastomeric composition have been described above, it is understood that the elastomeric composition could include different additive(s) or additional additives(s), each of which may be of any suitable type and in any suitable amount to form the desired article. The various additives in the elastomeric composition may be functional or inert. For example, the one or more additives may include: fillers or reinforcement agents (e.g., carbon blacks, silicas, calcium carbonates (chalk), kaolin (clays), aluminum silicates, calcium silicates, magnesium silicates (talc), or other minerals, or mixtures thereof); dispersed reinforcement fiber (e.g., chopped or spun (short) fiber formed from natural or synthetic material, such as cotton fiber, glass fiber, aramid fiber, polyester fiber, nylon fiber, mineral fiber, etc., or mixtures thereof); plasticizers, softeners, chain extending oils (e.g., mineral oils, paraffinic oils, naphthenic oils, polymer plasticizers, ester plasticizers, phthalate plasticizers, vegetable oils, epoxidized oils, or the like, or mixtures thereof); curing/vulcanizing agents or systems (e.g., sulfur, peroxides, or the like, or mixtures thereof); accelerators, activators (e.g., thiazoles, carbamates, sulfides, sulfenamides, stearic acids, metal oxides such as zinc oxide, etc., or mixtures thereof); retardants (e.g., carboxylates, resorcinol, cyclohexylthiophthalimide, etc., or mixtures thereof); antioxidants, antiozonants, stabilizers (e.g., phenolics, amines, phosphites, waxes, zinc oxide, etc., or mixtures thereof); flame retardants (e.g., antimony trioxide, aluminum hydroxide, magnesium hydroxide, organophosphorus compounds, halogenated compounds, intumescent materials such as intercalated graphite, etc., or mixtures thereof); anti-static agents (e.g., conductive fibers or fillers such as conductive carbon black, graphite, metallic powders, carbon nanotubes, graphene, etc., or mixtures thereof); coupling agents, adhesion promoters, tackifiers (e.g., silanes, titanates, rosins, hydrocarbon resins, etc., or mixtures thereof); pigments, dispersants, dyes and other colorants, or opacifying agents; various processing aids, flow modifiers, emulsifiers, thickeners, foaming or anti-foaming agents, wetting agents or surfactants; and/or any other suitable additive that may be added separately or in any suitable combination with the foregoing. It is of course understood that one or more of these additives may have multiple functions. Such additives may be added in suitable amounts, and the total additive content in the elastomeric composition may be in a relatively wide range from about 20 phr to about 700 phr, for example.

The formulation of the material may be compounded in a conventional mixing apparatus as an admixture of the rubber and additive components, and may be processed into the article according to conventional techniques including extruding or molding.

Article Embodiment(s)

Certain embodiments of the disclosure will hereafter be described with reference to the accompanying drawings, in which like reference numerals denote like elements. It should be understood, however, that the accompanying figures illustrate the various implementations described herein and are not meant to limit the scope of various technologies described herein. In addition, it is understood that various aspects and features of these embodiments may be substituted for one another or used in conjunction with one another where applicable. Furthermore, it is understood that the description of material(s) forming the various parts of one embodiment article may be the same material(s) for the same or similar part in another embodiment article, except as otherwise noted below.

Referring to FIG. 1, a barrier-type reinforced hose 100 is shown in a cut-away perspective view. The hose 100 includes an elastomeric layer 102 forming an inner tube (also 102) that forms an internal fluid passage, or lumen, through which fluid is conveyed. A permeation inhibiting barrier layer 104 is disposed outwardly of the inner tube 102. Disposed outwardly and adjacent to the permeation inhibiting barrier layer 104 is an intermediate layer 106. A reinforcing layer 108 is disposed outwardly from the intermediate layer 106. A cover layer 110 is disposed outwardly from the reinforcing layer 108 and is the outermost layer of the illustrated hose 100.

The inner tube 102 of the hose 100 is formed from an elastomeric composition which provides flexibility and elasticity. The elastomeric composition forming the inner tube 102 of the hose also may provide low extractables and chemical resistance to the substance being conveyed by the hose. In exemplary embodiments, the inner tube 102 is formed from the elastomeric composition described above. In alternative embodiments, the inner tube 102 is formed from a different elastomeric composition.

The inner tube 102 may have any suitable wall thickness to provide the properties desired for the application. In certain embodiments, hose 100 may have an inside diameter which is within the range of about 0.5 inch (12.7 mm) to about 6 inches (about 150 mm). The wall thickness of the inner tube 102 may be in a range from about 0.02 inch (0.5 mm) to about 0.16 inch (4 mm), more particularly from about 1 mm to about 3 mm.

The barrier layer 104 is configured to reduce permeation of the substance being conveyed, such as vapors from the liquid hydrocarbon fuel, to reduce losses. The barrier layer 104 is formed from the polyketone barrier layer described above. As noted above, when the inner tube 102 is formed from the exemplary elastomeric composition described above, the barrier layer 104 may be disposed adjacently and directly bonded to the inner tube 102 without an intervening adhesive layer. Alternatively, in some embodiments, the inner tube 102 may be formed from a different material and/or an adhesive layer may be employed.

To provide adequate permeation resistance while also maintaining suitable flexibility of the hose 100, the barrier layer 104 may have a wall thickness in a range from about 0.001 inch (0.025 mm) to about 0.030 in (0.76 mm), more particularly from about 0.002 inch (0.05 mm) to about 0.01 inch (0.254 mm) thick, for example.

The intermediate layer 106 may be formed as a backing layer, a tie layer, and/or a friction layer. As a backing layer, the layer 106 may provide additional stability to the hose. As a tie layer, the layer 106 is disposed adjacently and directly bonded to the opposite side of the PK barrier layer 104 without an intervening adhesive layer. The tie layer 106 may be formed from the same or similar elastomeric composition as described above to provide such a direct bond. Alternatively, the tie layer 106 may be formed from a different material and/or an adhesive layer may be employed. In addition, to "tie" the PK barrier layer 104 to the reinforcement layer 108, the tie layer 106 may provide bonding to the reinforcement layer 108, either directly or with the use of an adhesive layer. As a friction layer, the layer 106 generally serves to reduce wear by restricting rubbing of the reinforcement against the adjacent layer and may or may not be bonded to the reinforcement layer 108.

The layer 106 may have any suitable wall thickness for the application, and in some embodiments may be in a range from about 0.010 inches (0.25 mm) to about 0.120 inches (3 mm), for example.

The reinforcement layer 108 provides additional strength to the hose, typically by applying strands of reinforcement around the intermediate layer 106. The strands may have any suitable configuration or combination of configurations, and the strands may be made of any suitable material or combination of materials for reinforcing the hose.

For example, the reinforcement material of the strands may include, but is not limited to, metal, synthetic or natural material. For example, the reinforcement strands may be metal wire (such as steel wire, stainless-steel wire, plated-steel wire, plain steel wire, or the like). Synthetic materials may include nylon, vinylon, aramid, rayon, polyester (such as polyethylene terephthalate or polyethylene naphthalate), polyvinyl acetate, polyvinyl alcohol (PVA), poly p-phenylene-2,6-benzobisoxazole (PBO), polypropylene, polyamide, carbon fiber, or the like. Natural, ceramic, mineral, etc. fibers may include cotton, jute, hemp, basalt, glass, or the like.

The reinforcement strands may include elongated fibers, filaments, threads, wires, or the like, which may be in monofilament or multi-filament form. The individual strands may be grouped together to form bundles, tows, yarns, cords, or the like. Generally, a tow is a bundle of untwisted individual strands, a yarn is a bundle of twisted or cabled individual strands, and a cord is a twisted, braided, or cabled yarn or bundle of yarns. The individual strands or grouping of strands may be arranged in a spiral, braided, knitted, fabric, or wrapped reinforcement construction. In some embodiments, the hose may include one or more of these layers of reinforcement, and each layer may have a different orientation of strand arrangement. For example, where two or more layers of spiral reinforcement may be used, a first layer may be spiral wound in a first winding direction, and a second layer spiral wound in a second winding direction opposite the first winding direction. A braided configuration may include groupings of strands arranged in a 1-over, 1-under braid pattern, a 3-over, 3-under braid pattern, or a 4-over, 4-under braid pattern, or the like.

For the performance characteristics of a fuel transfer hose, such as a curb pump hose, the reinforcement layer 108 may have an arrangement of metal wires that are in a spiral wound or braided configuration. For example, the reinforcement layer 108 may be formed by braided steel wires manufactured utilizing a braiding machine having 16 to 36 carriers (bobbins of wire), with 2 to 12 wire ends of about 0.006 to about 0.015 inch (0.15 mm to 0.38 mm) gage. The braided steel wire used in the reinforcement layer 108 may have a wire pack coverage, which is within the range of about 30 percent to about 65 percent, in which the remaining 35 percent to 70 percent of the friction layer 104 is exposed through windows in the braid pattern. In other embodiments, to attain improved kink resistance, the reinforcement layer 108 may include multiple spiral laid wires of different sizes in conjunction with a textile braided construction.

The cover layer 110 is located outwardly of the reinforcement layer 108 and serves to protect the inner layers from the environment of the hose when deployed for use in the field. The cover layer 110 may have any suitable configuration and be made of any suitable material. Several factors may be used to determine the construction and/or materials selection for the cover layer, including but not limited to abrasion resistance, chemical resistance, economy, formability, aesthetics, or the like.

The cover layer 110 material may include, but is not limited to, natural rubber (NR), epoxidized natural rubber (ENR), polybutadiene rubber (BR), acrylonitrile butadiene rubber (NBR), carboxylated nitrile rubber (XNBR), (partially) hydrogenated nitrile rubber (HNBR), styrene butadiene rubber (SBR), carboxylated styrene-butadiene rubber (XSBR), styrene/ethylene-butylene/styrene-based (SEBS), ethylene propylene monomer (EPM), ethylene propylene diene monomer (EPDM), chloroprene rubber (CR), isoprene rubber (IR), butyl rubber (IIR), bromobutyl rubber (BIIR), chlorobutyl rubber (CIIR), chlorinated polyethylene (CPE), chlorosulfonated polyethylene (CSM), alkylated chlorosulfonated polyethylene (ACSM), polyepichlorohydrin rubbers (CO; ECO; ETER), ethylene-vinyl acetate rubber (EVA), acrylate rubber (ACM), ethylene-acrylate rubber (AEM), silicone rubber (MQ, VMQ, PVMQ, FVMQ), fluorine rubber (FKM), fluorinated methylsilicone rubber (MFQ), perfluorinated propylene rubber (FFPM), perfluorocarbon rubber (FFKM), thermoplastic elastomers (TPE), thermoplastic vulcanizates (TPV), thermoplastic polyurethanes (TPU), polyolefin elastomers (POE), polyvinylchloride (PVC), and/or polyurethane (PU), and/or the like, or blends thereof. In exemplary embodiments, the cover layer 110 includes PVC/NBR or PVC/XNBR mixtures.

The cover layer compound may further include various additives of suitable types and amounts, such as those described above for elastomeric layer, which may include, but is not limited to, pigments and/or dyes to provide a color, retardants, antioxidants, vulcanizing agents, cure accelerators or other processing aids, reinforcing agents and fillers, such as carbon black, silica, other mineral fillers (e.g., calcium carbonate, talc, etc.), or the like. As an example, reinforcing fillers may be provided in a broad range from about 20 phr to about 700 phr, including for example carbon black from about 200 phr to about 400 phr; and plasticizers such as oils may be provided in a range from about 10 phr to about 200 phr.

The cover layer 110 may have any suitable wall thickness, such as from about 0.060 inches (1.5 mm) to about 0.120 inches (3.0 mm), from about 0.070 inches (1.5 mm) to about 0.110 inches (2.8 mm) in thickness, or from about 0.080 inches (1.8 mm) to about 0.100 inches (2.5 mm) in thickness.

An exemplary method of forming the hose 100, may include at least the following steps: extruding the elastomeric layer 102; extruding the PK barrier layer 104; wherein the elastomeric layer 102 and the PA barrier layer 104 are in direct contact without an intervening adhesive layer; activating the peroxide cure system by increasing temperature; crosslinking the elastomeric layer 102 and directly bonding the elastomeric layer 102 to the PK barrier layer.

More specifically, a manufacturing process may include: mixing together the ingredients of the elastomeric composition; extruding the elastomeric composition to form the inner tube layer 102; extruding the PK barrier layer 104 directly onto the inner tube layer 102 without an intervening adhesive layer; extruding the tie layer 106 directly onto the PK barrier layer 104 without an intervening adhesive layer; applying the reinforcement layer 108; extruding the cover layer to overly the reinforcement layer 108; activating the peroxide cure system in at least the inner tube layer 102 and the tie layer 106 by increasing temperature; crosslinking the elastomeric composition of the inner tube layer 102 and tie layer 106; and directly bonding the inner tube layer 102 and tie layer 106 to the PK barrier layer 104.

Turning to FIG. 2, another embodiment of a hose 200 is shown in which a different material layer 212 forms the inner tube, and the elastomeric layer 102 formed from the elastomeric composition described above is disposed outwardly of the inner tube layer 212. In this embodiment, the material of inner tube layer 212 may be optimized for chemical resistance to the substance conveyed. For example, in a fuel transfer hose, the material of inner tube layer 212 may include NBR, HNBR, or the like. An adhesion layer may be disposed between the inner tube layer 212 and the elastomeric layer 102, or the inner tube layer 212 may be directly bonded to the layer 102.

Figures 3, 4:
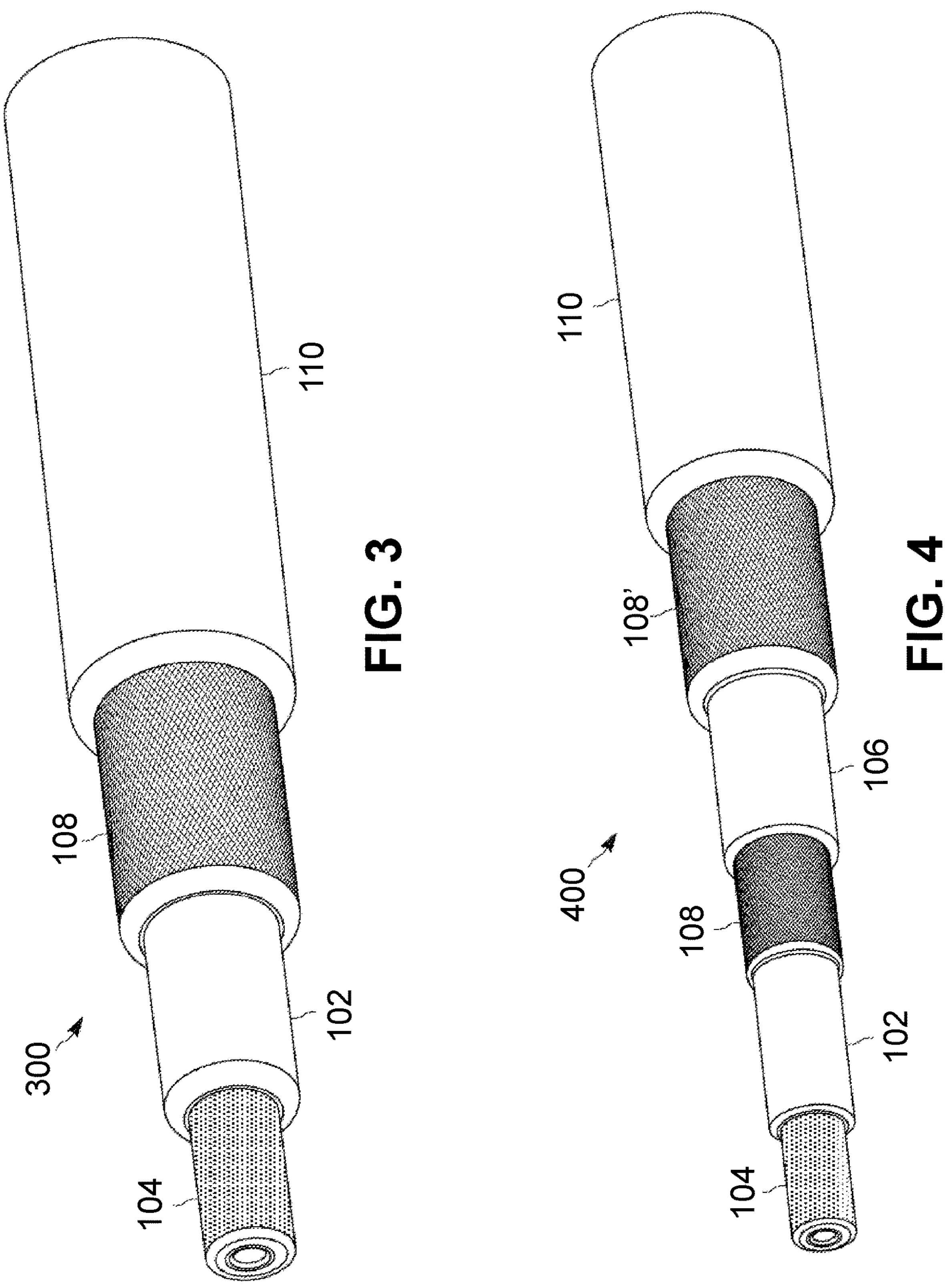
FIG. 3 shows another exemplary embodiment of a hose according to the present disclosure.
FIG. 4 shows another exemplary embodiment of a hose according to the present disclosure.

FIG. 3 shows another embodiment of hose 300 in which the PK barrier layer 104 forms the inner tube and the elastomeric layer 102 formed from the elastomeric composition described above is disposed outwardly of the barrier layer 104. Such a hose may be particularly useful in applications such as refrigerant hose or fuel hose. In this embodiment, there may be no intermediate layer 106, and the reinforcement layer 108 may be disposed outwardly adjacent to the elastomeric layer 102. The cover layer 110 is the outermost layer.

FIG. 4 shows yet another embodiment of hose 400, which is similar to hose 300 in which the PK barrier layer 104 forms the inner tube and the elastomeric layer 102 formed from the elastomeric composition described above is disposed outwardly of the barrier layer 104. The hose 400 differs in that it includes two reinforcement layers 108, 108', which may be the same or different, and an intermediate layer 106, such as a friction layer or tie layer, is disposed between the reinforcement layers 108, 108'. The cover layer 110 is the outermost layer.

Figure 5:
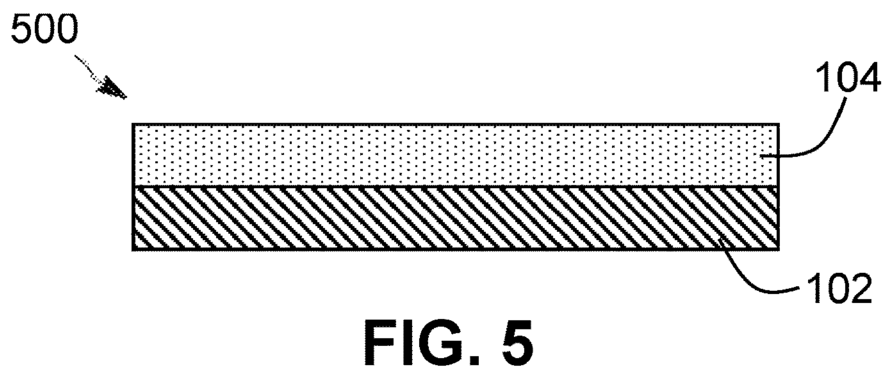
FIG. 5 shows an exemplary embodiment of an article according to the present disclosure.

FIG. 5 shows a cross-sectional view of an article 500 having an elastomeric layer 102 formed from the elastomeric composition described above, which is directly bonded to a PK barrier layer 104 without an adhesive intervening layer, in the manner described above. The article 500 is a permeation resistant article, which may be formed as a membrane, a seal, or the like.

Figure 6:
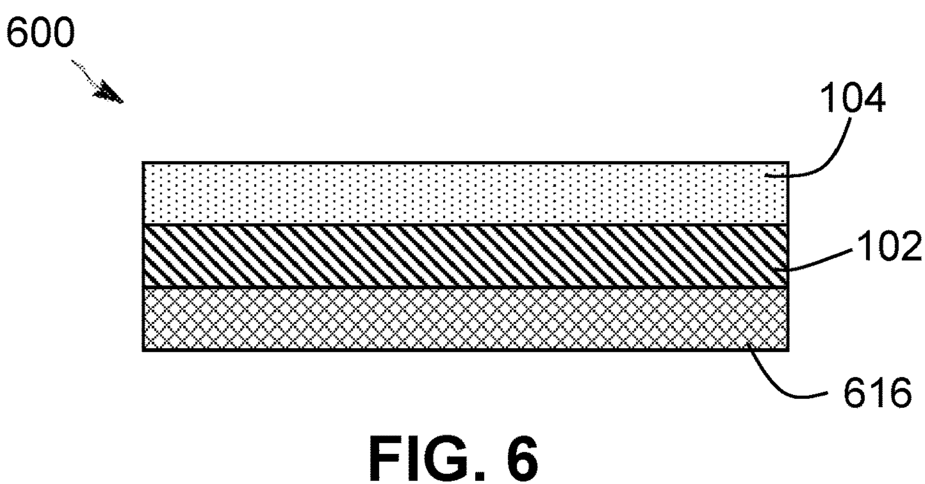
FIG. 6 shows another exemplary embodiment of an article according to the present disclosure.

FIG. 6 shows a cross-sectional view of another article 600 that is similar to article 500, except that article 600 further includes a reinforcement layer 616. The reinforcement layer may be the same as or similar to reinforcement layer 108 described above. Alternatively, the reinforcement layer 108 may include a different configuration of reinforcement strands than are used with a hose. The reinforcement strands in the layer 616 may include bi-directional, non-woven, woven, knitted, or braided fabric. The fabric may include warp and weft threads laid at any desired angle. The fabric layer 120 may be a plated knitted fabric including courses of yarn knitted together. In some embodiments, more than one ply of fabric may be employed. If desired, the fabric may be cut on a bias so that the strands form an angle with the longitudinal direction of the. The angle may be of any suitable angle, for example, but not limited to 0 or 90 degrees, or any point along the continuum there between. The fabrics for use in reinforcement layer 616 may be formed from any suitable material or combination of materials. For example, the fabrics for use in the reinforcement layer 616 may be formed from materials including nylon (such as nylon 4,6, nylon 6, 6, and nylon 6), cotton, polyester, cotton/polyester, nylon/polyester, cotton/nylon, aramid, rayon, or the like. Hybrid designs, for reinforcement layer 616 may be coated with an elastomeric material. In some embodiments, the fabric layer may have a different coating on one side to assure that the fabric layer 616 is bonded to the elastomeric layer 102 (for example); and may have a different coating on the opposite side to provide low friction, abrasion resistance, or other suitable function.

Figure 7:
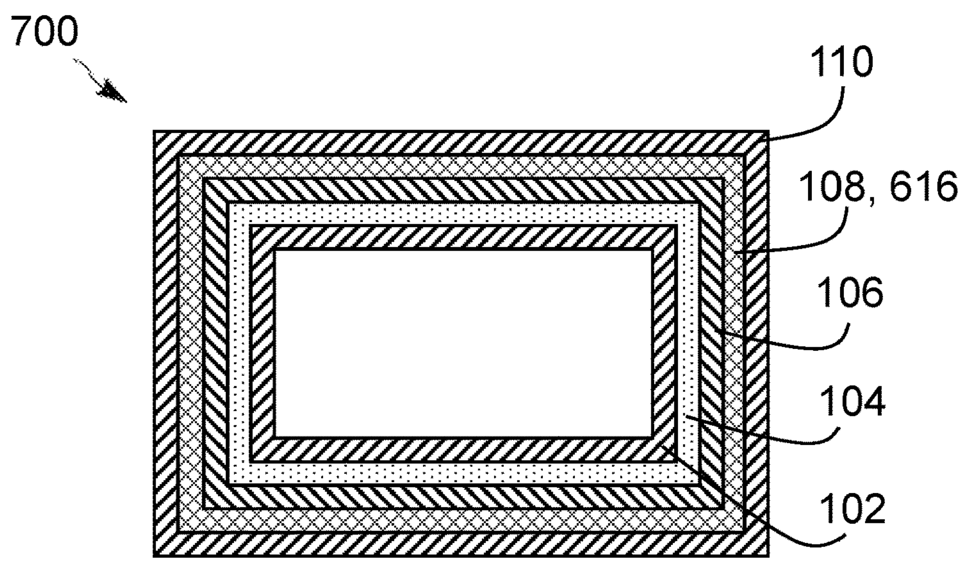
FIG. 7 shows another exemplary embodiment of an article according to the present disclosure.

FIG. 7 shows a cross-sectional view of another article 700, which is a permeation resistant article that encloses a space to contain a substance. Such an article 700 may be a bladder, container, or the like. The article 700 includes a similar layer configuration as the hose 100, and as such the same reference numerals are used to denote like elements. The reinforcement layer 108 may be configured as a reinforcement layer for a hose, as described above, or may have a reinforcement structure more similar to the layer 616 described above.

It is understood that the articles 500, 600 and 700 are not limited to the layers shown, but also could include additional layers on either side or as intermediate layers, as may be desired for the particular application.

According to an aspect, a multilayer article configured for permeation resistance includes: an elastomeric layer directly bonded to a polyketone (PK) barrier layer without an intervening adhesive layer, the elastomeric layer formed from a composition comprising one or more ethylene-vinyl acetate elastomer(s) (EVM).

According to an aspect, a multilayer hose includes: an elastomeric layer directly bonded to a polyketone (PK) barrier layer without an intervening adhesive layer, the elastomeric layer formed from a composition comprising one or more ethylene-vinyl acetate elastomer(s) (EVM).

According to an aspect, a method of manufacturing a hose includes: mixing the ingredients of an elastomeric composition; extruding the elastomeric composition as a layer of the hose; extruding a PK barrier layer; wherein the elastomeric layer and the PK barrier layer are in direct contact without an intervening adhesive layer; crosslinking the elastomeric layer and directly bonding the elastomeric layer to the PK barrier layer.

According to an aspect, a fuel transfer hose configured to transfer hydrocarbon fuel, in particular liquid gas, includes an elastomeric layer and a polyketone barrier layer.

According to an aspect, a fuel system includes: a source of hydrocarbon fuel, in particular liquid hydrocarbon gasoline; the hose according to any of the foregoing or following fluidly connecting the source of fuel.

According to an aspect, an elastomeric composition capable of bonding directly to a PK barrier layer without an intervening adhesive layer, includes: one or more ethylene vinyl acetate elastomer(s) (EVM(s)) in a total amount from 5 phr to 80 phr; one or more additional elastomer(s) in a total amount from 20 phr to 95 phr; one or more reinforcing agent(s) in a total amount from about 40 phr to about 120 phr, and one or more plasticizer(s) in a total amount from about 10 phr to about 40 phr.

Exemplary embodiment(s) may include one or more of the following additional features combined with any of the foregoing aspects, in which one or more of these additional features may be combined separately or in any suitable combination with each other.

In exemplary embodiment(s), the elastomeric layer exhibits its bonding to the polyketone barrier layer of 10 lbf/in or greater, more particularly 25 lbf/in or greater, and up to 50 lbf/in when tested according to ASTM D413-98.

In exemplary embodiment(s), the polyketone barrier layer exhibits a permeation rate of CE10 fuel of less than 15 $g/m^2/day$, more particularly less than 10 $g/m^2/day$, more particularly less than 5 $g/m^2/day$, or even more particularly less than 1 $g/m^2/day$ when tested according to SAE J2665 at 25° C. and 30 in·Hg.

In exemplary embodiment(s), the polyketone barrier layer is formed from an essentially pure aliphatic polyketone material of formula $[—CHR_1CH_2(C{=}O)—]_n[—CHR_2CH_2(C{=}O)—]_m]_P$ where $R_1$ and $R_2$ are different from each other and are independently hydrogen or a $C_1$-$C_{12}$-alkyl group, n+m=1, and p is an integer, and the two comonomers may be randomly distributed or present as blocks.

In exemplary embodiment(s), the one or more EVM(s) have a vinyl acetate content in a range from 40% by weight of the copolymer to 90% by weight of the copolymer, more particularly from 50 wt. % to 90 wt. %.

In exemplary embodiment(s), the one or more EVM(s) are present in a total amount from 5 phr to 80 phr, more particularly from 10 phr to 50 phr, or even more particularly from 10 phr to 30 phr.

In exemplary embodiment(s), the elastomeric composition further comprising one or more additional base elastomer(s), more particularly CPE(s), NBR(s), HNBR(s), CR(s), SBR(s), and/or CSM(s), in a total amount from 20 phr to 95 phr, more particularly from 50 phr to 90 phr, or even more particularly from 70 phr to 90 phr.

In exemplary embodiment(s), the one or more EVM(s) serve as a bonding agent and are present in a total amount that improves bonding to the PK barrier layer as compared to a same elastomeric composition without any EVM(s).

In exemplary embodiment(s), the one or more EVM(s) are present in a total volume % relative to the overall elastomeric composition in a range from 3 vol. % to 48 vol. %, more particularly from 5 vol. % to 30 vol. %, or even more particularly from 5 vol. % to 20 vol. %.

In exemplary embodiment(s), a ratio of the total amount of EVM(s) to the total amount of additional base elastomer(s) is in a range from 5:95 to 80:20, more particularly 10:90 to 50:50, more particularly 10:90 to 30:70.

In exemplary embodiment(s), the elastomeric composition further comprises one or more reinforcing agent(s), more particularly calcium carbonate(s), silica(s), and/or carbon black(s), in a total amount from 40 phr to 120 phr, more particularly from 50 phr to 100 phr.

In exemplary embodiment(s), the one or more additive(s) include one or more calcium carbonate(s) present in a total amount from 25 phr to 75 phr, more particularly from 40 phr to 60 phr.

In exemplary embodiment(s), the one or more additive(s) include one or more silica(s) present in a total amount from 10 phr to 50 phr, more particularly from 10 phr to 30 phr.

In exemplary embodiment(s), the elastomeric composition contains less than 15 phr any carbon black, more particularly is free of any carbon black.

In exemplary embodiment(s), the elastomeric composition contains at least one mineral filler.

In exemplary embodiment(s), the elastomeric composition further comprises one or more plasticizer(s), in particular non-oil plasticizer(s), more particularly trimellitate ester plasticizer(s), in a total amount from 10 phr to 40 phr, more particularly 15 phr to 30 phr.

In exemplary embodiment(s), the elastomeric composition is cured by an organic peroxide in a total amount from 2 phr to 10 phr, and a curing co-agent in a total amount from 2 phr to 15 phr.

In exemplary embodiment(s), the material properties of the elastomeric composition includes one or more original properties of: (i) elongation at break of greater than 70%, more particularly greater than 100%; (ii) modulus of elasticity at 100% of greater than 500 psi; (iii) tensile strength of greater than 1,000 psi; and/or (iv) Shore A hardness in a range from 70 to 90.

In exemplary embodiment(s), the elastomeric layer forms an inner layer of the hose.

In exemplary embodiment(s), the PK barrier layer is disposed outwardly of the elastomeric layer.

In exemplary embodiment(s), a tie layer is disposed outwardly of the PK barrier layer, the tie layer being directly bonded to the PK barrier layer without an intervening adhesive layer, in particular wherein the tie layer is formed from an elastomeric composition comprising one or more ethylene-vinyl acetate elastomer(s) (EVM).

In exemplary embodiment(s), a reinforcement layer disposed outwardly of the tie layer.

In exemplary embodiment(s), a cover layer disposed outwardly of the reinforcement layer.

In exemplary embodiment(s), the PK barrier layer forms the inner tube layer of the hose that defines the lumen, and the elastomeric layer is disposed outwardly of the PK barrier layer.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described.

Thus, while a particular feature may have been described with respect to only one or more of several embodiments, such feature may be combined with one or more other features of the other embodiments, separately or in any combination. The same may also be varied in many ways. Such variations are not to be regarded as a departure from the disclosure, and all such modifications are intended to be included within the scope of the disclosure. as may be desired and advantageous for any given or particular application.

Any background information contained in this disclosure is to facilitate a better understanding of the various aspects described herein. It should be understood that any such background statements are to be read in this light, and not as admissions of prior art. Likewise, the description and examples are presented herein solely for the purpose of illustrating the various embodiments of the disclosure and should not be construed as a limitation to the scope and applicability of the disclosure.

The phrase "and/or" as used in this disclosure should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" as used in this disclosure should be understood as being inclusive and not exclusive. For example, when separating items in a list, "or" or "and/or" shall be interpreted as being inclusive, i.e., the inclusion of at least one, but also including more than one, of a number or list of elements, and, optionally, additional unlisted items. For example, a condition A or B is satisfied by anyone of the following: A is true (or present) and B is false (or not present), A is false (or not present) and B is true (or present), and both A and B are true (or present). Only terms clearly indicating exclusivity should be interpreted as indicating exclusive alternatives (i.e. "one or the other but not both"), such as "either," "only one of," or "exactly one of." In other words, such terms of exclusivity refer to the inclusion of exactly one element of a number or list of elements.

Any references to "one embodiment" or "an embodiment" as used herein is understood to mean that a particular element, feature, structure, or characteristic described in connection with the embodiment is included in at least one embodiment. The appearances of the phrase "in one embodiment" in various places in the specification are not necessarily referring to the same embodiment.

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The word "exemplary" is used herein to mean "serving as an example or illustration." Any aspect or design described herein as "exemplary" is not necessarily to be construed as preferred or advantageous over other aspects or designs. Likewise, the phrases "particularly," "preferably," or the like as used in this disclosure may refer to an element or value that provides advantage(s) in some embodiment(s), however is not intended to limit the scope of the disclosure to those "particular" or "preferable" features.

Transitional language such as "including," "comprising," "having," "containing," "involving," or variations thereof, is intended to be broad and encompass the subject matter listed thereafter, equivalents, and additional subject matter not recited, i.e., to be open-ended and meaning including but not limited to.

It is to be understood that terms such as "top," "bottom," "upper," "lower," "left," "right," "front," "rear," "forward," "rearward," or the like may refer to an arbitrary frame of reference, rather than to the ordinary gravitational frame of reference.

It is to be understood that all values, ranges, ratios or the like as described in this disclosure may be combined in any manner. In addition, it is to be understood that a concentration or amount or value range listed in this disclosure is intended to include any and every concentration or amount or value within the range, including the end points, as if each value within the range has been expressly stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that the inventor(s) appreciate and understand that any and all data points within the range are to be considered to have been specified, and that inventor(s) had possession of the entire range and all points within the range.

In addition, each numerical value used in this disclosure should be read once as modified by the term "about" (unless already expressly so modified), and then read again as not so modified unless otherwise indicated in context. The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values. When the term "about" is used in describing a value or an end-point of a range, the disclosure should be understood to include the specific value or end-point referred to.

The term "consisting essentially of" in relation to a composition is to indicate that substantially (e.g., greater than 95 weight % or greater than 99 weight %) of the component(s) present in the composition is the component(s) recited. Therefore, this term does not exclude the presence of minor additives or impurities as would be understood by those having ordinary skill in the art.

Although the invention has been shown and described with respect to a certain embodiment or embodiments, it is apparent that equivalent alterations and modifications will occur to those having ordinary skill in the art upon the reading and understanding this disclosure, and such modifications are intended to be included within the scope of this disclosure as defined in the claims. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure.

LIST OF REFERENCE NUMERALS (PART OF THE SPECIFICATION)

100, 200, 300, 400 Hose
102 Elastomeric layer
104 Barrier layer
106 Intermediate Layer
108, 108' Reinforcement layer
110 Cover layer
212 Inner Tube
500, 600, 700 Article
616 Reinforcement layer

What is claimed is:

1. A multilayer hose comprising:
an elastomeric layer forming an inner layer of the hose;
a polyketone (PK) barrier layer directly bonded to the elastomeric layer without an intervening adhesive layer;
a reinforcement layer disposed outwardly of the PK barrier layer; and
a cover layer disposed outwardly of the reinforcement layer;
wherein the PK barrier layer exhibits a permeation rate of CE10 fuel of less than 15 $g/m^2$/day, when tested according to SAE J2665 at 25° C. and 30 in·Hg;
wherein the elastomeric layer is formed from a composition comprising:
one or more chlorinated polyethylene elastomer(s) (CPE) in a total amount from 50 phr to 90 phr;
one or more ethylene-vinyl acetate elastomer(s) (EVM) in a total amount from 10 phr to 30 phr, the one or more EVM(s) having a vinyl acetate content in a range from 40% by weight of the copolymer to 90% by weight of the copolymer;
one or more reinforcing agent(s) in a total amount from 40 phr to 120 phr; and
a peroxide cure system;
wherein the one or more EVM(s) are present in a total volume % relative to the overall elastomeric composition in a range from 5 vol. % to 30 vol. % and serve as a bonding agent to the PK barrier layer, when cured, without the elastomeric composition having polyketone contained therein, such that the elastomeric layer exhibits bonding to the PK barrier layer in a range from 10 lbf/in to 50 lbf/in, when tested according to ASTM D413-98.

2. The multilayer hose according to claim 1, wherein:
the polyketone barrier layer is formed from an essentially pure aliphatic polyketone material of formula [[—CHR1CH2(C═O)-]n [—CHR2CH2(C═O)-]m]P where R1 and R2 are different from each other and are independently hydrogen or a C1-C12-alkyl group, n+m=1, and p is an integer, and the two comonomers may be randomly distributed or present as blocks.

3. The multilayer hose according to claim 1, wherein:
the one or more additive(s) include one or more calcium carbonate(s) present in a total amount from 25 phr to 75 phr.

4. The multilayer hose according to claim 1, wherein:
the one or more additive(s) include one or more silica(s) present in a total amount from 10 phr to 50 phr.

5. The multilayer hose according to claim 1, wherein:
the elastomeric composition contains less than 15 phr any carbon black; and
the elastomeric composition contains at least one mineral filler.

6. The multilayer hose according to claim 1, wherein: the elastomeric composition further comprises one or more non-oil plasticizer(s) in a total amount from 10 phr to 40 phr.

7. The multilayer hose according to claim 1, wherein:
the elastomeric composition is cured by an organic peroxide in a total amount from 2 phr to 10 phr, and a curing co-agent in a total amount from 2 phr to 15 phr.

8. The multilayer hose according to claim 1, wherein: the material properties of the elastomeric composition includes one or more original properties of: (i) elongation at break of greater than 70%; (ii) modulus of elasticity at 100% of greater than 500 psi; (iii) tensile strength of greater than 1,000 psi; and/or (iv) Shore A hardness in a range from 70 to 90.

9. The multilayer hose according to claim 1, wherein:
the elastomeric layer forms an inner tube of the hose;
the PK barrier layer is disposed outwardly of the elastomeric layer;
a tie layer is disposed outwardly of the PK barrier layer, the tie layer being directly bonded to the PK barrier layer without an intervening adhesive layer, wherein the tie layer is formed from an elastomeric composition comprising one or more ethylene-vinyl acetate elastomer(s) (EVM); and
the reinforcement layer disposed outwardly of the tie layer.

10. A method of manufacturing the hose according to claim 1, comprising:
mixing the ingredients of the elastomeric composition;
extruding the elastomeric composition as a layer of the hose;
extruding the PK barrier layer;
wherein the elastomeric layer and the PK barrier layer are in direct contact without an intervening adhesive layer;
crosslinking the elastomeric layer and directly bonding the elastomeric layer to the PK barrier layer.

11. A fuel system comprising:
a source of liquid hydrocarbon gasoline;
the hose according to claim 1 fluidly connecting the source of fuel.

12. The multilayer hose according to claim 1, wherein:
the one or more CPE(s) are present in a total amount from 75 phr to 90 phr,
the one or more EVM(s) are present in a total amount from 10 phr to 25 phr,
the one or more EVM(s) are present in a total volume % relative to the overall elastomeric composition in a range from 5 vol. % to 20 vol. %.

* * * * *